(12) United States Patent
Carroll, III et al.

(10) Patent No.: US 8,069,655 B2
(45) Date of Patent: Dec. 6, 2011

(54) APPARATUS, SYSTEM, AND METHOD FOR USING A FRACTION OF ENGINE EXHAUST TO DELIVER A DOSANT

(75) Inventors: John T. Carroll, III, Columbus, IN (US); Laszlo D. Tikk, Columbus, IN (US)

(73) Assignee: Cummins Filtration IP, Inc., Minneapolis, MN (US)

(*) Notice: Subject to any disclaimer, the term of this patent is extended or adjusted under 35 U.S.C. 154(b) by 952 days.

(21) Appl. No.: 11/838,081

(22) Filed: Aug. 13, 2007

(65) Prior Publication Data

US 2009/0044526 A1    Feb. 19, 2009

(51) Int. Cl.
    *F01N 3/00*    (2006.01)

(52) U.S. Cl. ........... 60/286; 60/274; 60/287; 60/295; 60/301; 137/599.12; 137/625.11; 137/872

(58) Field of Classification Search .......... 60/273, 60/274, 280, 281, 284–288, 291, 295, 299–301, 60/305; 137/599.12, 599.14, 599.15, 205.5
See application file for complete search history.

(56) References Cited

U.S. PATENT DOCUMENTS

| | | | |
|---|---|---|---|
| 3,908,371 A | 9/1975 | Nagai et al. | |
| 4,137,881 A | 2/1979 | Jordan | |
| 4,612,770 A * | 9/1986 | Tadokoro et al. | 60/602 |
| 4,633,671 A | 1/1987 | Schatz | |
| 4,848,510 A | 7/1989 | Ahmed | |
| 5,012,778 A | 5/1991 | Pitzi | |
| 5,067,320 A | 11/1991 | Kanesaki | |
| 5,459,998 A * | 10/1995 | Hosoya et al. | 60/284 |
| 5,544,483 A * | 8/1996 | Heuer | 60/283 |
| 6,041,594 A | 3/2000 | Brenner et al. | |
| 6,250,073 B1 * | 6/2001 | Zimmer et al. | 60/281 |
| 6,301,879 B1 | 10/2001 | Weisweiler et al. | |
| 6,526,746 B1 * | 3/2003 | Wu | 60/286 |
| 6,662,553 B2 | 12/2003 | Patchett et al. | |
| 6,739,126 B2 | 5/2004 | Huthwohl | |
| 6,761,025 B1 | 7/2004 | Gladden | |
| 6,843,966 B1 | 1/2005 | Mahr | |
| 6,845,611 B2 | 1/2005 | Huthwohl et al. | |
| 6,928,807 B2 * | 8/2005 | Jacob et al. | 60/286 |
| 7,017,336 B2 | 3/2006 | Stiermann | |

(Continued)

FOREIGN PATENT DOCUMENTS

WO    2006066043 A1    6/2006

OTHER PUBLICATIONS

PCT/US2008/073008, International Search Report and Written Opinion, Nov. 14, 2008.

*Primary Examiner* — Thomas Denion
*Assistant Examiner* — Jesse Bogue
(74) *Attorney, Agent, or Firm* — Kunzler Needham Massey & Thorpe

(57) ABSTRACT

An apparatus, system, and method are disclosed for delivering a dosant with engine exhaust. The apparatus includes a flow-rate regulator disposed downstream from an engine exhaust manifold that operates to control a fraction of exhaust from the engine exhaust manifold. The apparatus also includes a doser disposed downstream of the flow-rate regulator that provisions a supply of dosant to the path of the controlled fraction of exhaust, which atomizes, vaporizes, disperses, mixes with, and/or delivers the dosant.

15 Claims, 8 Drawing Sheets

U.S. PATENT DOCUMENTS

| | | |
|---|---|---|
| 7,040,087 B2 * | 5/2006 | Nakatani et al. ............... 60/286 |
| 7,067,319 B2 | 6/2006 | Wills et al. |
| 7,178,328 B2 | 2/2007 | Solbrig |
| 7,178,329 B2 * | 2/2007 | Bertiller et al. ............... 60/286 |
| 7,210,286 B2 | 5/2007 | Sun et al. |
| 7,581,386 B2 * | 9/2009 | Ranalli et al. ............... 60/286 |
| 2004/0093856 A1 | 5/2004 | Dingle et al. |
| 2005/0193724 A1 * | 9/2005 | Webb et al. ............... 60/289 |
| 2006/0260299 A1 | 11/2006 | Wang et al. |
| 2007/0033927 A1 | 2/2007 | Homby et al. |

* cited by examiner

APPARATUS, SYSTEM, AND METHOD FOR USING A FRACTION OF ENGINE EXHAUST TO DELIVER A DOSANT

BACKGROUND OF THE INVENTION

1. Field of the Invention

This invention relates to the efficient operation of engine exhaust treatment systems, and more particularly relates to the delivery of a dosant to exhaust treatment systems.

2. Description of the Related Art

Stricter environmental regulations in the United States and Europe are requiring the use of exhaust treatment devices such as particulate filters and/or catalytic devices on engines to reduce harmful emissions including nitrogen oxides (NOx), hydrocarbons, carbon monoxide, and particulate matter. Leading exhaust treatment devices, such as particulate filters, NOx adsorbers, and Selective Catalytic Reduction (SCR) sub-systems, benefit from—and even rely upon—the thermal and chemical conditioning of exhaust being feed to these treatment devices.

For example, NOx adsorbers require the injection of a chemical dosant for regeneration. A dosant, such as aqueous urea or various hydrocarbon fuels, serves as a reductant. This injected reductant creates a saturated reductant-to-oxygen ratio in the conditioned exhaust. Excess reductant drives the nitrates from the NOx adsorber site and converts the nitrates to nitrogen, thereby regenerating the NOx adsorber.

However, dosant delivery systems require additional components and additional space. Space is usually at a premium around engines and their related components, particularly on trucks or other moving vehicles, and it is desirable that the additional exhaust treatment components be compacted into as small a space as possible. The problem of efficient use of exhaust stream dosants makes the issue of space more difficult, since many dosants, after being injected or "dosed" into the exhaust stream, need to mix, undergo chemical change, be evaporated, or otherwise be modified from their original injected form before encountering exhaust treatment components such as flow-through catalytic devices or particulate filters.

Hydraulic and thermal energy present in engine exhaust can be used to atomize, disperse, vaporize, mix, and/or transport a dosant. The use of an engine byproduct, such as engine exhaust, to disperse a dosant can reduce the number of additional components and additional space required to implement a dosant delivery system. However, the channeling of engine exhaust can itself present additional problems that can also require additional components and additional space to address.

Several approaches exist to regulate and control the flow of engine exhaust through dosant deliver systems. Such approaches generally address problems like changing exhaust supplies and temperatures and unwanted exhaust pressure buildup in the dosant delivery system. To address these problems, previous approaches have relied upon additional components, which occupy additional space.

One approach relies on such additional components as a carbon chamber, a feedback into the intake manifold, a pressure relief valve, a solenoid coil, and a vacuum responsive modulator. These additional components and the space they occupy mitigate the advantages of using engine exhaust to disperse a dosant.

From the foregoing discussion, it should be apparent that a need exists for an apparatus, system, and method that can control a fraction of engine exhaust used to deliver a dosant without an excess of additional space and component requirements.

SUMMARY OF THE INVENTION

The present invention has been developed in response to the present state of the art, and in particular, in response to the problems and needs in the art that have not yet been fully solved by currently available dosant delivery systems. Accordingly, the present invention has been developed to provide a compact, movable, and simple apparatus, system, and method for delivering a dosant with engine exhaust that overcome many or all of the above-discussed shortcomings in the art.

An apparatus is provided to deliver a dosant with engine exhaust, where the apparatus is compact, movable, and simple. The apparatus may have an exhaust fractionator, which in one embodiment may comprise an exhaust redirection channel configured to redirect a fraction of exhaust from the exhaust manifold of an engine away from the engine exhaust system. The apparatus may further have a flow-rate regulator to control the mass flow rate of the fraction of exhaust.

The flow-rate regulator may be formed with a choke or a solenoid and a stop. In embodiments formed with a choke, the choke has a narrowed region that creates a pressure differential between the intake and the outtake of the choke sufficient to generate the known phenomenon of choked flow. The choke keeps the mass flow rate of the fraction of exhaust within an acceptable range according to the principles of choked flow.

In embodiments formed with a solenoid and a stop, the solenoid controls the stop to block or to clear the exhaust redirection channel, thereby controlling the mass flow rate of the fraction of exhaust. Both the choke and the solenoid and stop combination are able to elegantly and simply control the mass flow rate of the fraction of exhaust, both being movable to any location with respect to the engine exhaust system. Other simple, compact and movable flow-rate controllers may be employed.

The apparatus may include a dowser disposed downstream of the flow-rate regulator. The doser provisions liquid dosant in the path of the controlled fraction of exhaust. Hydraulic and thermal energy in the fraction of exhaust atomize, vaporize, disperse, mix, and/or deliver the dosant. The apparatus may include a dosant delivery channel that carries the resultant mixture back to the engine exhaust system and to an exhaust treatment system that uses the dosant to regenerate the system or to thermally and chemically treat exhaust.

A system is provided to deliver a dosant with engine exhaust, where the system is compact, movable, and simple. The system may include a first elongate exhaust channel configured to redirect a fraction of exhaust from the exhaust manifold of an engine away from a turbine of a turbocharger, located in the engine exhaust system. The turbine creates an energy differential as energy rich exhaust entering the turbine becomes energy depleted exhaust by giving up energy to turn the turbine.

The first elongate exhaust channel directs the fraction of exhaust to a flow-rate regulator to control the mass flow rate of the fraction of exhaust. The flow-rate regulator may be a choke and/or a solenoid and stop combination, as discussed above. The fraction of exhaust controlled by the flow-rate regulator then enters a mixing chamber coupled to the outlet of the first elongate exhaust channel. A doser provisions a supply of dosant, controlled by a control valve, to the mixing chamber.

A second elongate exhaust channel coupled to the mixing chamber carries a mixture of dosant and the controlled flow of the fraction of exhaust to the engine exhaust system at point after the outtake of the turbine, transferring the large energy differential in the engine exhaust system between the intake and the outtake of the turbine to the fraction of exhaust flowing through the mixing chamber. The energy differential increases the energy available in the fraction of exhaust to atomize, vaporize, disperse, mix, and/or deliver the dosant.

A method is provided to deliver a dosant with engine exhaust, where the system is compact, movable, and simple. The method in the disclosed embodiments substantially includes the steps necessary to carry out the functions presented above with respect to the operation of the described apparatus and system. The method may begin by conducting a fraction of exhaust away from an engine exhaust system.

The method proceeds by controlling the mass flow rate of that fraction of exhaust. The means for controlling the mass flow-rate for the fraction of exhaust may include a choke and/or a solenoid and a stop combination, as discussed above, or another simple and compact means for controlling a fraction of exhaust. The controlled flow of the fraction of exhaust atomizes, vaporizes, and/or disperses a dosant, mixing with the dosant in the process. The dosant may then be delivered to an exhaust treatment system. Within the exhaust treatment system, the dosant may be used to thermally and chemically treat exhaust or to regenerate the system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
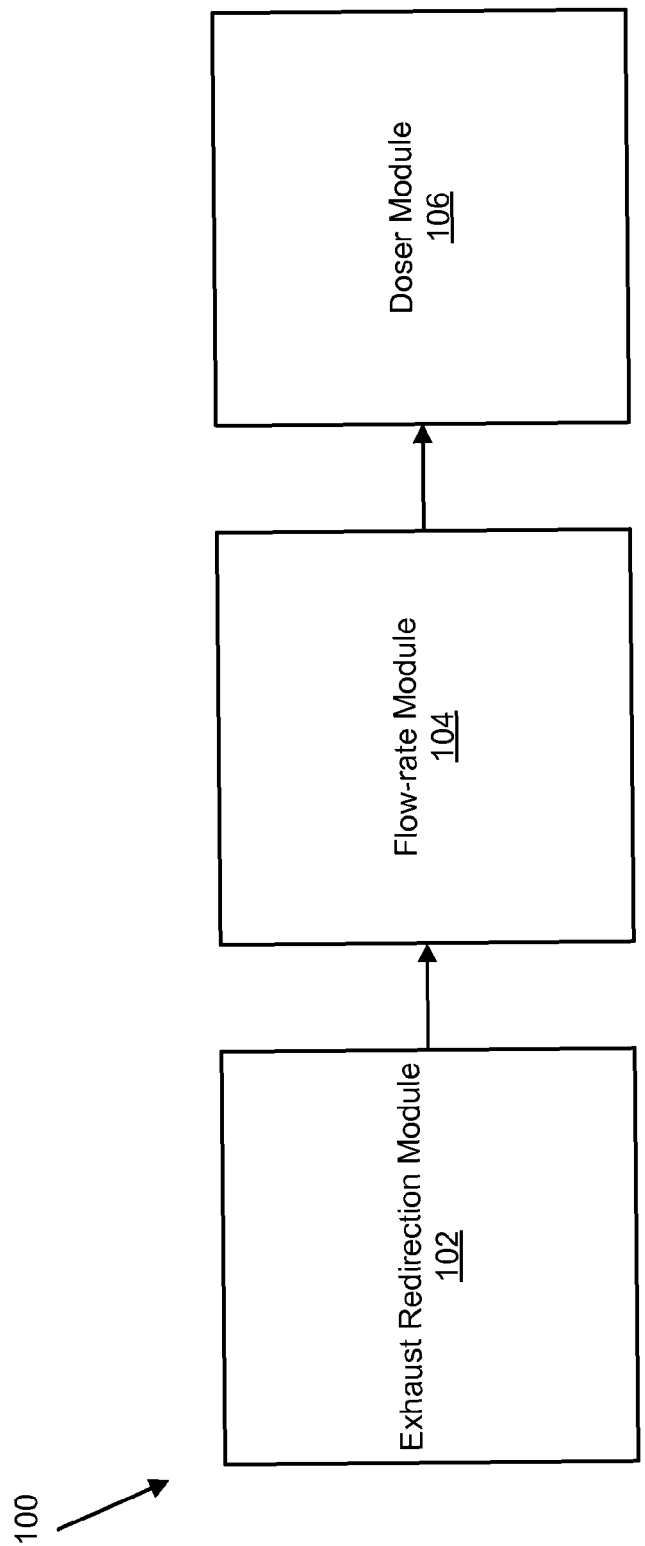
FIG. 1 is a schematic block diagram illustrating one embodiment of an exhaust doser in accordance with the present invention.

FIG. 1 is a schematic block diagram illustrating one embodiment of an exhaust doser 100 in accordance with the present invention. The exhaust doser 100 includes an exhaust redirection module 102, flow-rate module 104, and a doser module 106, described below. The various components of the exhaust doser 100 cooperate to deliver a dosant by means of engine exhaust.

A fractionator, which in this embodiment comprises an exhaust redirection module 102, redirects a fraction of exhaust from an engine away from the ordinary flow path of engine exhaust. The exhaust redirection module 102 then directs the fraction of exhaust toward a flow-rate module 104. The exhaust redirection module 102 may also include computer readable code, implemented in software or programmable hardware, that determines and controls the appropriate amount of exhaust to fraction off and away from its the ordinary flow path in response to changing conditions in the engine, an exhaust system, and/or an exhaust treatment system.

The flow-rate module 104 regulates the mass flow rate of the redirected fraction of exhaust. The flow-rate module 104 may also include computer readable code, implemented in software or programmable hardware, that determines and controls the appropriate flow rate for the fraction of exhaust in response to changing conditions in the engine, the exhaust system, and/or the exhaust treatment system. The regulated fraction of exhaust is then directed to the doser module 106. The doser module 106 provisions a supply of liquid dosant in the path of the regulated fraction of exhaust. The doser module 106 then uses the hydraulic and/or thermal energy in the fraction of the exhaust to atomize, vaporize, disperse, and/or mix the dosant with the fraction of exhaust. The doser module 106 may also include computer readable code, implemented in software or programmable hardware, that determines and controls the provisioning of a dosant at appropriate intervals and in appropriate amounts in response to changing conditions in the engine, the exhaust system, and/or the exhaust treatment system.

Figure 2:
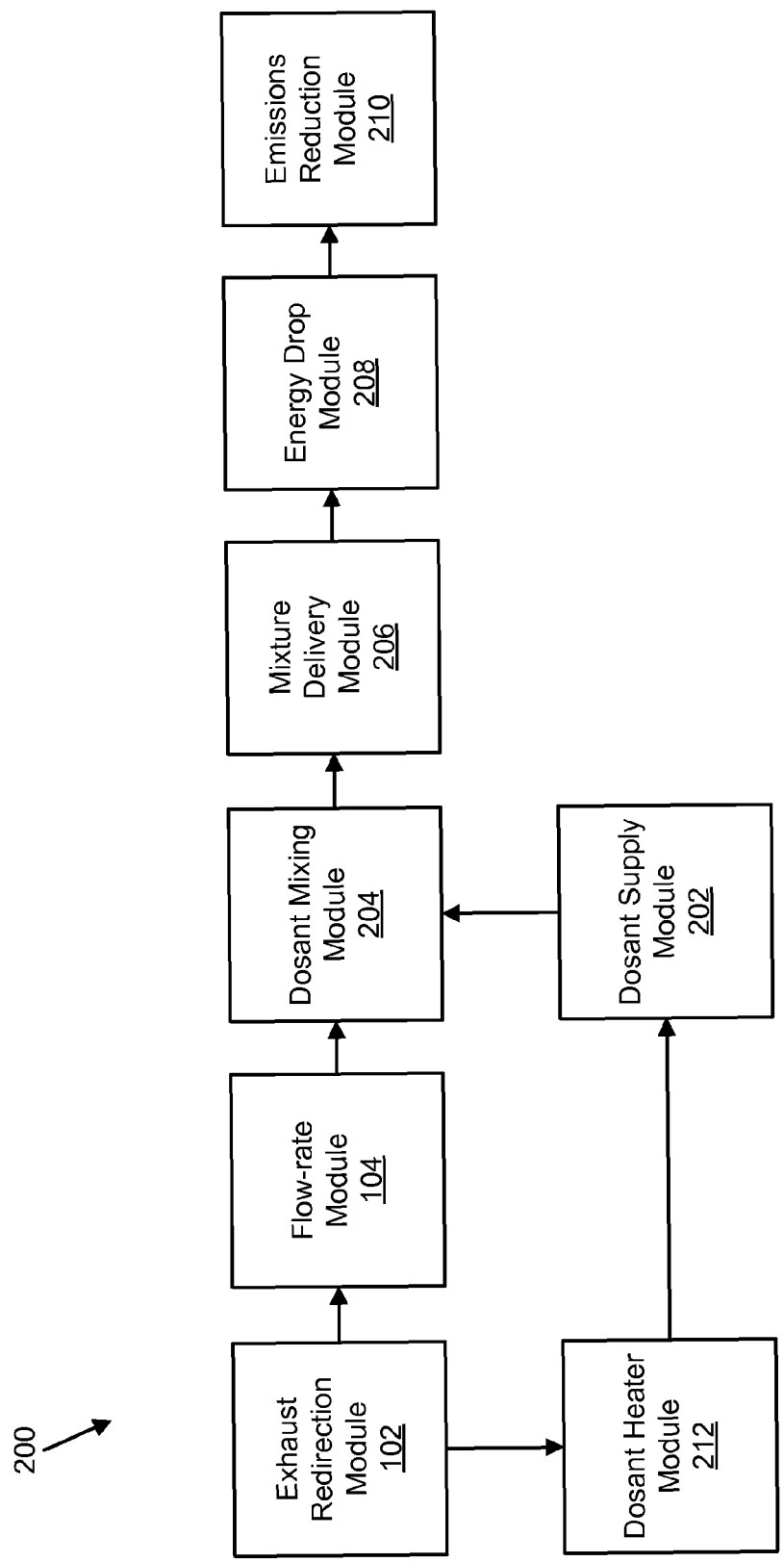
FIG. 2 is a schematic block diagram illustrating another embodiment of an exhaust doser in accordance with the present invention.

FIG. 2 is a schematic block diagram illustrating another embodiment of an exhaust doser 200 in accordance with the present invention. The exhaust doser 200 includes an exhaust redirection module 102, a flow-rate module 104, a dosant supply module 202, a dosant mixing module 204, a mixture delivery module 206, an energy drop module 208, an emissions reduction module 210, and a dosant heater module 212, which are described below. The various components of the exhaust doser 200 cooperate to deliver a dosant to an exhaust treatment system with a fraction of engine exhaust.

The exhaust redirection module 102 and the flow-rate module 104 are substantially similar to those included in the exhaust doser 100 depicted in FIG. 1. Exhaust doser 200 may also be provided with a dosant supply module 202 that provisions a supply of liquid dosant to a dosant mixing module 204, with which the exhaust doser 200 may be provided. In certain embodiments, the dosant supply module 202 may change the supply of dosant in response to changing conditions, or according to a predetermined schedule. The dosant supply module 202 may include computer readable code, implemented in software or programmable hardware, that determines and controls the provisioning of a dosant at appropriate intervals and in appropriate amounts in response to changing conditions in the engine, the exhaust system, and/or the exhaust treatment system.

The dosant mixing module 204 uses the hydraulic and/or thermal energy in the fraction of exhaust directed to the dosant mixing module 204 by the flow-rate module 104 to atomize, vaporize, disperse, and/or mix the dosant with the fraction of exhaust. The mixture delivery module 206, with which the exhaust doser 200 may be provided, directs the mixture of dosant and the fraction of exhaust back to the ordinary flow path of engine exhaust, from which the fraction of exhaust was originally redirected by the exhaust redirection module 102.

The exhaust doser 200 is provided with an energy drop module 208. The energy drop module 208 creates a pressure drop and/or a thermal drop between the point where the exhaust redirection module 102 redirects a fraction of exhaust away from the ordinary flow path of the engine exhaust and the point where the mixture delivery module 206 returns the fraction of exhaust, admixed with the dosant, to the ordinary flow path. Greater drops in pressure and/or temperature result in greater amounts of energy, whether hydraulic or thermal, in the fraction of exhaust at the disposal of the dosant mixing module 204. One example of a means for creating an energy drop is a turbine. As exhaust from the engine turns the turbine, it loses hydraulic and thermal energy, resulting in an energy differential.

The exhaust doser 200 is provided with an emissions reduction module 210. The emissions reduction module 210 receives the mixture of dosant and exhaust delivered to the ordinary flow path of engine exhaust by the mixture delivery module 206. The emissions reduction module 210 then applies the mixture of dosant and exhaust to various treatment systems, regenerating the systems and/or enhancing their efficiency as will be evident to skilled in the relevant art in light of this disclosure.

In certain embodiments, the exhaust doser 200 is provided with a dosant heater module 212. In embodiments with a dosant heater module 212, the exhaust redirection module 102 redirects a second fraction of exhaust away from the ordinary flow path of engine exhaust and delivers the second fraction of exhaust to the dosant heater module 212. The dosant heater module 212 then uses hydraulic and thermal energy in the second fraction of exhaust to heat the supply of dosant and various mechanisms employed by the dosant supply module 202 to keep the dosant supply module 202 in working condition. The dosant heater module 212 may include computer readable code, implemented in software or programmable hardware, that determines and controls the appropriate amount of exhaust to fraction off and away from its the ordinary flow path and toward the doser in response to changing conditions in the engine, an exhaust system, and/or an exhaust treatment system.

Figure 3:
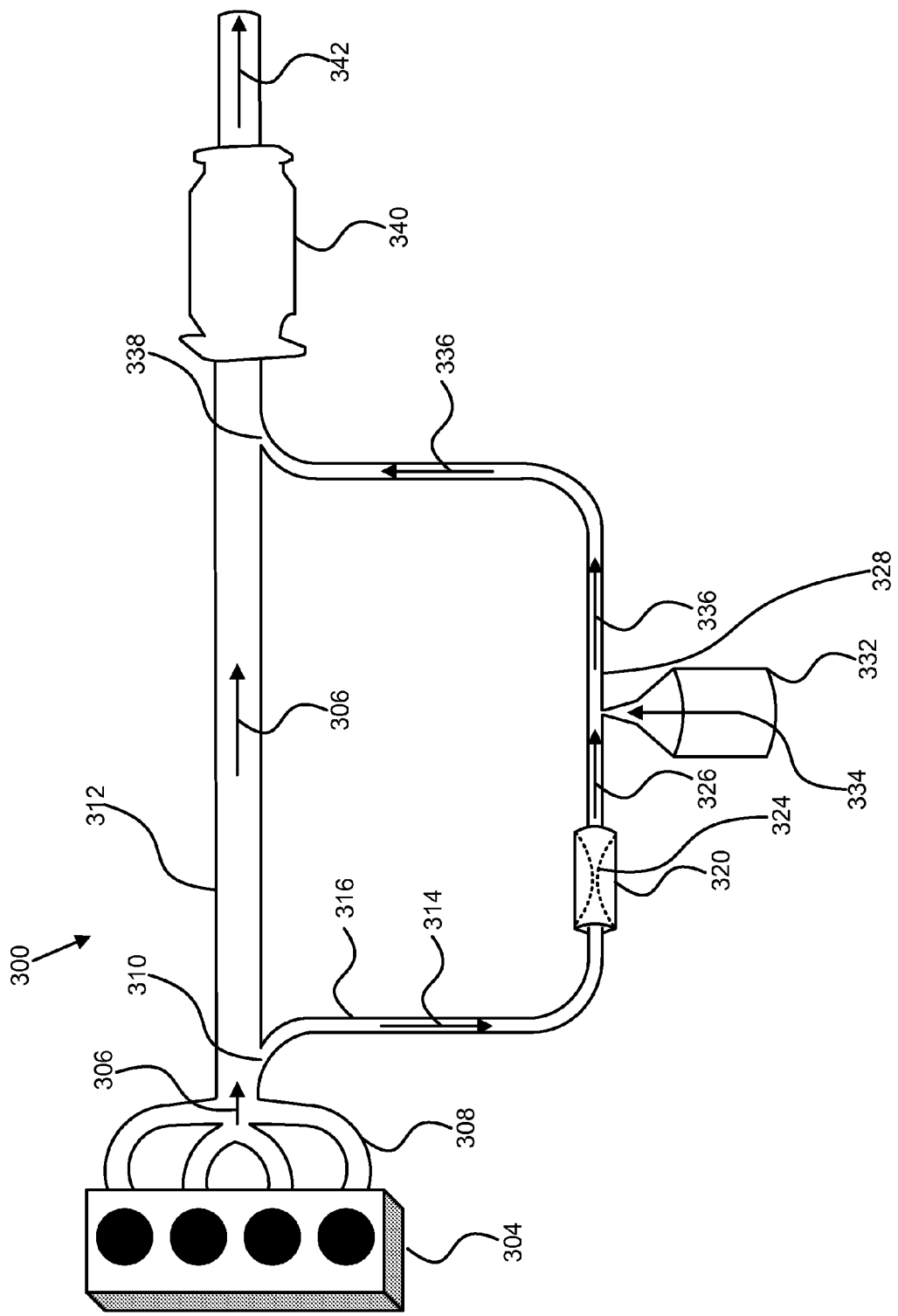
FIG. 3 is a schematic view illustrating one embodiment of an exhaust doser in accordance with the present invention.

FIG. 3 is schematic view of an exhaust doser system 300 in accordance with the present invention. The system 300 includes an engine 304, an exhaust manifold 308, an engine exhaust system 312, an exhaust redirection channel 316, a choke 320, a dosant delivery channel 328, a doser 332, and an exhaust treatment system 340. The various components of the exhaust doser 200 cooperate to deliver a dosant 334 to an exhaust treatment system 340 with a fraction of engine exhaust 314.

The engine 304 produces engine exhaust 306 that may be collected by an exhaust manifold 308. An exhaust redirection channel intake 310 may be disposed in the engine exhaust system 312 to redirect a fraction of engine exhaust 314 through an exhaust redirection channel 316, with the outlet of the exhaust redirection channel 316 connected to a choke 320. In certain embodiments of the present invention, however, the choke 320 is replaced by a commercially available flow regulator. In one embodiment, the exhaust redirection channel intake 310 is connected directly to the exhaust manifold 308.

The interior of the choke 320 has a narrowed region 324. The narrowed region 324 results in a pressure differential between the intake and the outtake of the choke 320 sufficient to generate the known phenomenon of choked flow. The choke 320 regulates the mass flow rate of the fraction of exhaust 314 according to the principles of choked flow.

Although changes in temperature and pressure in the fraction of exhaust 314 at the intake side of the choke 320 will affect the mass flow rate of the fraction of exhaust 314 passing through the choke 320, the effect of changes in temperature and pressure greatly reduce once the phenomenon of choked flow obtains. One of ordinary skill in the relevant art uses principals of choked flow, together with known equations, to determine the diameter of the narrowed region 324 of the choke 320. By controlling the diameter of the narrowed region 324, one of ordinary skill in the relevant art, in light of this disclosure, may control the mass flow rate of the fraction of exhaust 314.

In certain embodiments, the diameter of the narrowed region 324 of the choke 320 is adjustable. The diameter of the narrowed region 324 may change in response to changing engine conditions and dosing needs. One skilled in the relevant art will determine the parameters for these adjustments and any sensors or other apparatus necessary to realize them.

A controlled fraction of exhaust 326 exits the choke 320, in certain embodiments, into a dosant delivery channel 328. The dosant delivery channel 328 carries the controlled fraction of exhaust 326 to a doser 332. In certain embodiments, the doser 332 supplies an amount of liquid dosant 334 to the dosant delivery channel 328. In one embodiment, the dosant 334 is aqueous urea. In another embodiment, the dosant 334 is a hydrocarbon fuel, possibly the same fuel used to run the engine. Other dosants 334 are possible. One of ordinary skill in the relevant art can determine the particular dosant 334 and the amounts of that dosant 334 to be supplied by the doser 332, based on the nature the engine 304, the exhaust 306, and the exhaust treatment system 340.

The hydraulic and thermal energy in the controlled fraction of exhaust 326 flowing across the dosant 334 atomizes, vaporizes, and disperses the dosant 334, mixing with the dosant 334 in the process. The resultant mixture 336 continues along the dosant delivery channel 328 to the dosant delivery channel outlet 338. The dosant delivery channel outlet 338 directs the resultant mixture 336 into the engine exhaust system 312 where the resultant mixture is carried, together with the exhaust 306, to the engine exhaust treatment system 340.

The engine exhaust treatment system 312 may be formed with a particulate filter, a NOx adsorber, a Selective Catalytic Reduction (SCR) sub-system, or the like, or any combination of these. The engine exhaust treatment system 312 may use the resultant mixture 336 to regenerate itself. The engine exhaust treatment system 340 may also use the resultant mixture 336 to thermally and chemically condition the exhaust 306 and the resultant mixture 336 entering the engine exhaust treatment system 340. Treated exhaust 342 exits the exhaust treatment system 340.

Figure 4:
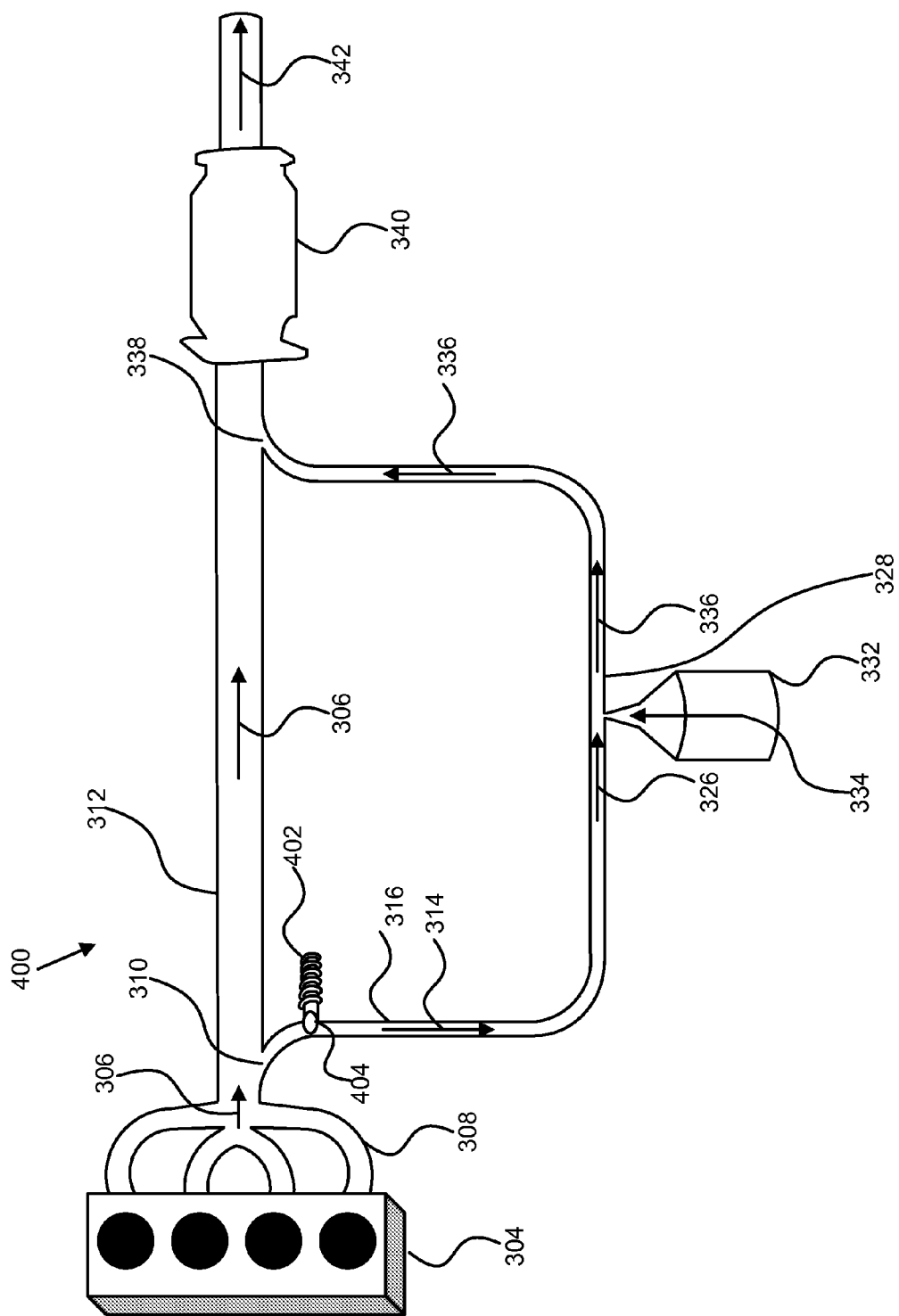
FIG. 4 is a schematic view illustrating another embodiment of an exhaust doser in accordance with the present invention.

FIG. 4 is a schematic view illustrating another embodiment of an exhaust doser system 400 in accordance with the present invention. The system 400 includes an engine 304, an exhaust manifold 308, an engine exhaust system 312, an exhaust redirection channel 316, a solenoid 402, an exhaust redirection channel stop 404, a dosant delivery channel 328, a doser 332, and an exhaust treatment system 340. The various components of the exhaust doser 400 cooperate to control the fraction of exhaust 314 used to deliver a dosant 334 to an exhaust treatment system 340.

With respect to system 400, the engine 304, the exhaust manifold 308, the engine exhaust system 312, the exhaust redirection channel 316, the dosant delivery channel 328, the doser 332, and the exhaust treatment system 340 perform functions substantially similar to those discussed above with respect to FIG. 3. However, the exhaust doser 400 does not use a choke 320 to control the mass flow rate of the fraction of the exhaust 314. The exhaust doser 400 uses a solenoid 402 and an exhaust redirection channel stop 404 to control the mass flow rate of the fraction of exhaust 314. Certain embodiments of the present invention use neither a choke 320 nor a solenoid 402 and a stop 404 combination, but rather a commercially available flow regulator.

The solenoid 402 controls the exhaust redirection channel stop 404, which is disposed within the exhaust redirection channel 316. When fully extended into the exhaust redirection channel 316, the exhaust redirection channel stop 404 blocks the channel, preventing the flow of a fraction of exhaust 314 to the doser 332. When fully retracted from the exhaust redirection channel 316, the exhaust redirection channel stop 404 allows the full fraction of exhaust to travel unimpeded toward the doser 332. In one embodiment, the solenoid 402 controls the exhaust redirection channel stop 404 to be in only one of two positions, fully extended or fully retracted. In another embodiment, the solenoid 402 controls the exhaust redirection channel stop 404 by degrees, occupying any number of positions on a continuum from fully extended to fully retracted.

The solenoid 402 controls the exhaust redirection channel stop 404 with a current that can be generated in response to needs by the exhaust treatment system 340 for dosant 334. For example, in one embodiment, if the exhaust treatment system 340 is formed with a particulate filter, the particulate filter may only require dosant 334 every few days or during some predefined period for the purpose of regeneration. In such cases, the solenoid 402 may receive a current from signal generator attached to programmable circuitry capable of receiving a dosing schedule.

In other embodiments, the solenoid 403 may be connected to sensors located within the engine 304, the exhaust treatment system 340, or at other locations within the exhaust doser 400. The sensors would allow the solenoid 402 to respond to changing conditions in the exhaust doser 400. The materials, locations, and parameters of such sensors are known to those of ordinary skill in the relevant art.

Figure 5:
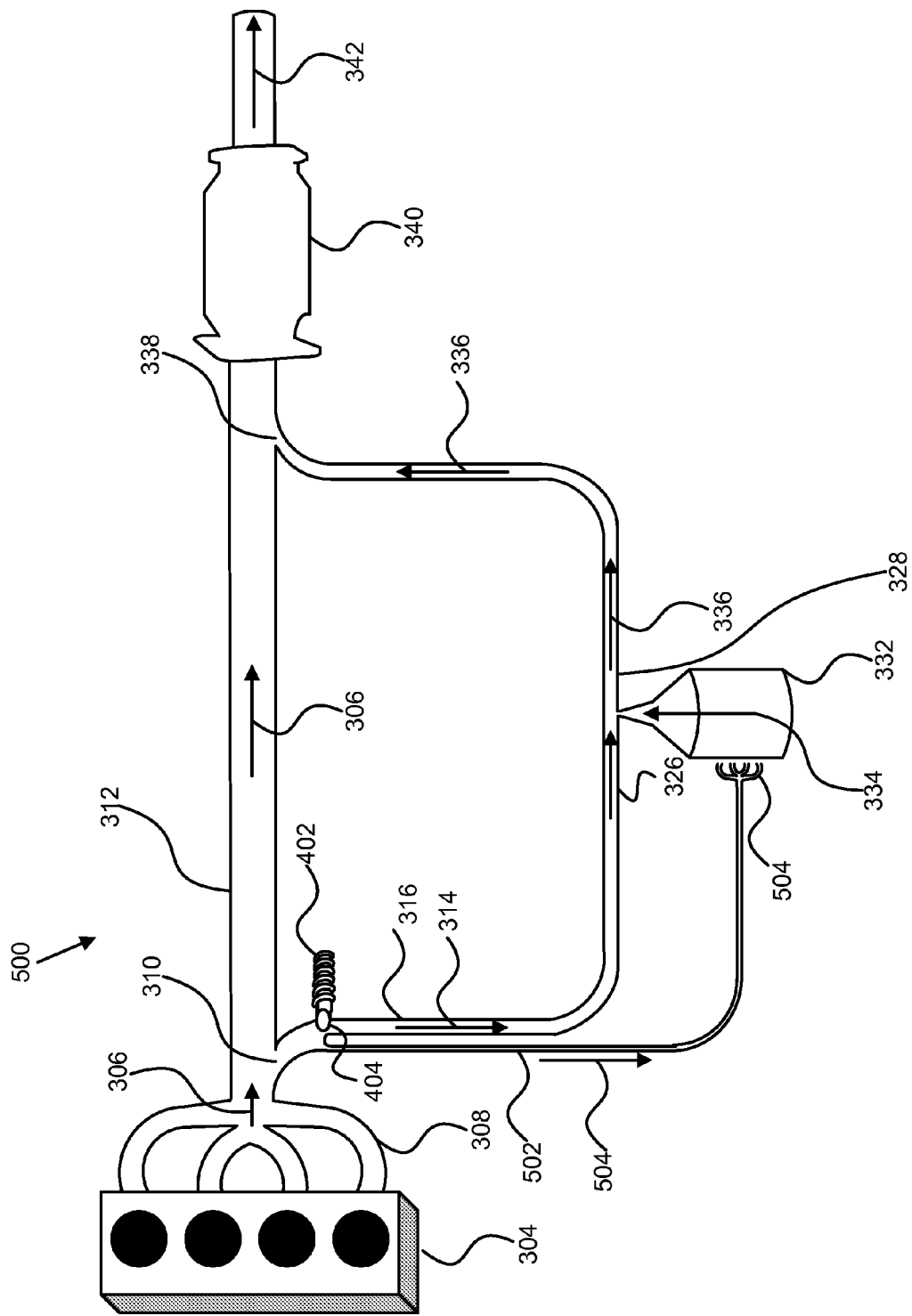
FIG. 5 is a schematic view illustrating another embodiment of an exhaust doser in accordance with the present invention.

FIG. 5 is a schematic view illustrating another embodiment of an exhaust doser system 500 in accordance with the present invention. The system 500 includes an engine 304, an exhaust manifold 308, an engine exhaust system 312, an exhaust redirection channel 316, a second exhaust redirection channel 502, a solenoid 402, a exhaust redirection channel stop 404, a dosant delivery channel 328, a doser 332, and an exhaust treatment system 340. The various components of the exhaust doser 500 cooperate to select a fraction of exhaust 314 used to deliver a dosant 334 or a fraction of exhaust 504 used to heat the doser 332 and the fraction of exhaust 314 used to deliver the dosant 334.

With respect to the system 500, the engine 304, the exhaust manifold 308, the engine exhaust system 312, the exhaust redirection channel 316, the solenoid 402, the exhaust redirection channel stop 404, the dosant delivery channel 328, the doser 332, and the exhaust treatment system 340 perform functions substantially similar to those discussed above. However, the exhaust doser 500 uses the exhaust redirection channel stop 404 to direct the flow of exhaust rather than to block the flow of exhaust.

In the system 500, the solenoid 402 controls the exhaust redirection channel stop 404 to be in only one of two positions, fully extended or fully retracted. In the fully extended position, the exhaust redirection channel stop 404 fully blocks the fraction of exhaust 314 from flowing along the exhaust redirection channel 316, leaving only the second exhaust redirection channel 502 to collect a fraction of exhaust. When the exhaust redirection channel 316 is blocked, therefore, only a small, second fraction of exhaust 504 travels down the second exhaust redirection channel 502. In certain embodiments, when the exhaust redirection channel stop 404 is fully retracted, an appendage to the exhaust redirection channel stop 404 blocks the second exhaust redirection channel 502, leaving only the exhaust redirection channel 316 to collect a fraction of exhaust.

The second exhaust redirection channel 502 is connected to heating pipes 506, used to warm the doser 332 and the dosant 343. Therefore, when the exhaust redirection channel stop 404 is fully extended only a small fraction of exhaust 504 is redirected away from the engine exhaust system 312. This small fraction of exhaust keeps the doser 332 and the dosant 324 warm so that the doser 332 and the dosant 334 are in condition to perform their intended functions when the exhaust redirection channel 316 is again opened, especially when ambient temperatures are cold. When the exhaust redirection channel stop 404 is fully retracted, the exhaust redirection channel 316 receives a fraction of exhaust 314 used to deliver the dosant 334, and the second exhaust redirection channel 506 receives a small fraction of exhaust 504 used to heat the dosant 334 and the doser 332.

Figure 6:
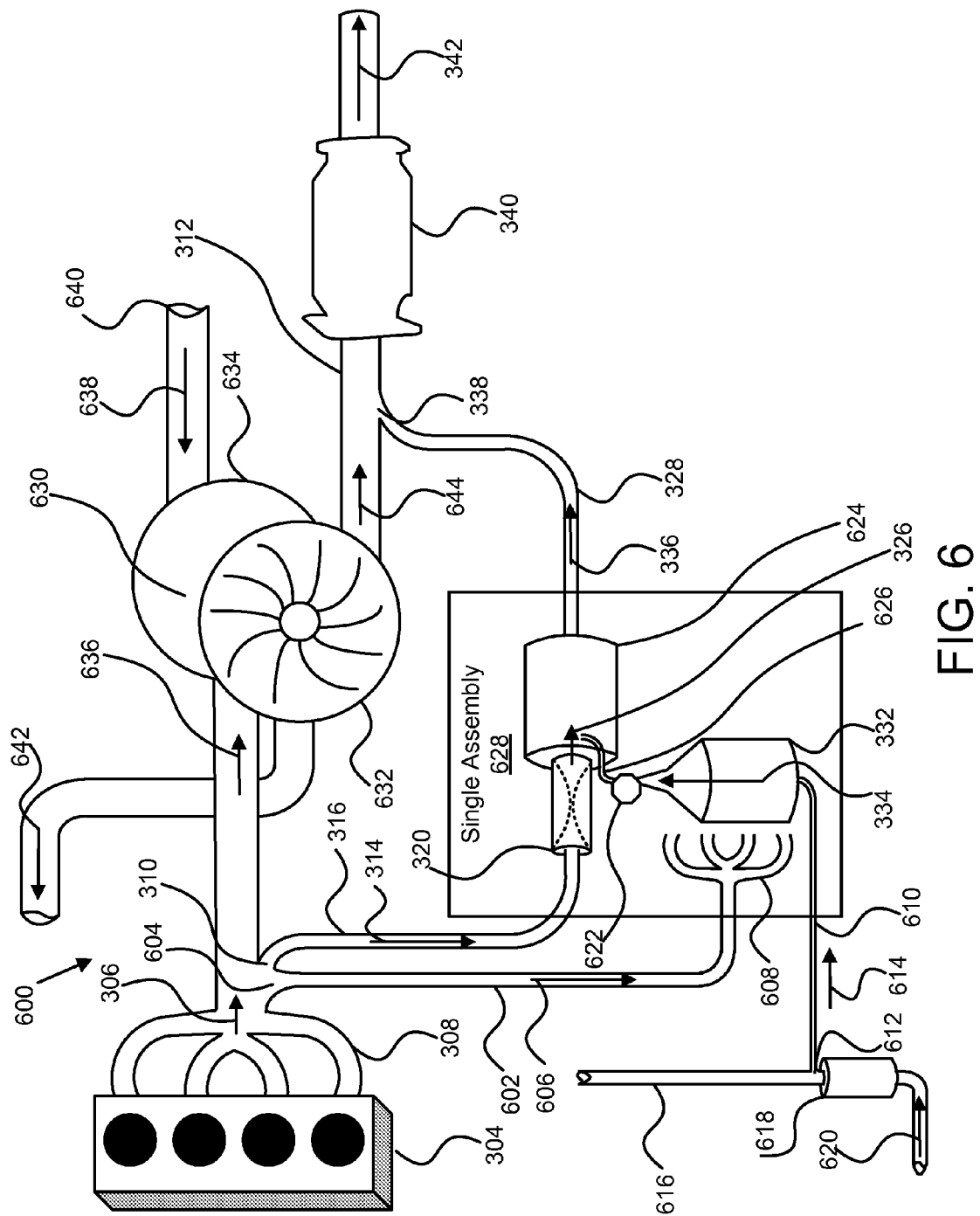
FIG. 6 is a schematic view illustrating another embodiment of an exhaust doser in accordance with the present invention.

FIG. 6 is a schematic view illustrating another embodiment of an exhaust doser system 600 in accordance with the present invention. The system 600 may include an engine 304, an exhaust manifold 308, an engine exhaust system 312, an exhaust redirection channel 316, a heating redirection channel 602, heating pipes 608, a doser supply channel 610, a fuel supply line 616, a fuel pump 618, a doser 332, a control valve 622, a mixing chamber 624, a dosant supply line 626, a choke 320, a solenoid 402, an exhaust redirection channel stop 404, a single assembly 628, a turbocharger 330, a dosant delivery channel 328, and an exhaust treatment system 340, which are described below. The various components of the exhaust doser 600 cooperate to supply, warm, disperse, and deliver a dosant 334 with engine exhaust.

In the system 600, the engine 304 may be a diesel engine or may be another form of combustion engine. The exhaust redirection channel 316, the doser 332, the choke 320, the solenoid 402, the exhaust redirection channel stop 404, the dosant delivery channel 328, and the exhaust treatment system 340 perform functions substantially similar to those described above. Certain embodiments of the present invention, however, use neither a choke 320 nor a solenoid 402 and a stop 404 combination, but rather a commercially available flow regulator. Newly enumerated components combine to warm the doser 332 and the dosant 334, provide dosant 334 in the form of engine fuel, control the flow of dosant 334, better mix and disperse the dosant 334, and create hydraulic, energy, and thermal differentials used to mix and disperse the dosant 334, as all described below.

In certain embodiments, the system 600 has a heating redirection channel 602 with a heating redirection channel intake 604. The heating redirection channel intake 604 receives a second fraction of exhaust 606 and conducts the second fraction of exhaust to a series of heating pipes 608. The heating pipes 608 keep the doser 332 and the dosant 324 warm and ready to perform their functions, even in cold temperatures.

In certain embodiments, a doser supply channel 610 with a doser supply channel intake 612 delivers a stream of fuel to the doser 332, to be used as a dosant 334. The doser supply channel 610 provides the stream of fuel 614 by redirecting it away from the fuel supply line 616 after a fuel pump 618. The fuel pump 618 pumps fuel from a fuel tank 620 that provides fuel to the engine 304.

In certain embodiments, the doser 332 is provided with a control valve 622. The control valve 622 controls the amount of dosant 334 that the doser 332 places in front of the fraction of exhaust 314 used to deliver the dosant 334. In one embodiment, the control valve, is coupled to a memory device with programmable logic, capable of receiving a schedule for dosant delivery. In another embodiment, the control valve 622 may be connected to sensors located within the engine 304, the exhaust treatment system 340, or at other locations within the exhaust doser 400. The sensors allow the control valve 622 to respond to changing conditions in the exhaust doser 400. The materials, locations, and parameters of such sensors are known to those of ordinary skill in the relevant art.

In certain embodiments, the exhaust doser 600 contains a mixing chamber 624 that receives the controlled fraction of exhaust 326 and the dosant 334 from a dosant supply line 626. The mixing chamber 624 provides a space in which the controlled fraction of exhaust 326 can better atomize, disperse, vaporize, mix, and/or transport a dosant 334 with the controlled fraction of exhaust 326. The mixing chamber releases the resultant mixture 336 into the dosant delivery channel 328.

In one embodiment, the choke 320 and the doser 332, may be combined in a single assembly 628. In another embodiment, the choke 320, the doser 332, and the mixing chamber 324 may be combined in a single assembly 628. In certain embodiments, the doser 332, as combined in the single assembly 628, may include a control valve 622. In other embodiments that entail a single assembly 628, the solenoid 402 and the exhaust redirection channel stop 404 may take the place of the choke.

When combined in a single assembly 628, the core elements of the system 600 are compact and occupy little space. Furthermore, the single assembly 628 may be located in any location with respect to the engine 304 and the exhaust treatment system 340. The compact nature of the single assembly 628 and the ability to locate the single assembly 628 in any number of locations provides many advantages over anything known in the relevant art.

In certain embodiments, the system 600 is provided with a turbocharger 630. The turbocharger 630 includes a turbine 632 and a compressor 634. The turbine 632 receives energy rich exhaust 636 from the engine exhaust system 612. The energy rich exhaust 636 turns the turbine 632 and, in turn, the compressor 634, which compresses air 638 from an air intake 640 to produce charged air 642 for the engine 304. In turning the turbine 632, the energy rich exhaust 636 losses energy.

Therefore, the turbine 632 returns energy depleted exhaust 644 to the engine exhaust system 312.

Between the turbine 632 intake and outtake, the energy rich exhaust 636 losses energy in the form of both thermal energy and hydraulic energy. Therefore, the turbocharger 630 creates thermal, pressure, and energy differentials between the exhaust redirection channel intake 310 and the dosant delivery channel outtake 338. These differentials increase the energy, both hydraulic and thermal, used to atomize, disperse, vaporize, mix, and/or transport a dosant 334.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
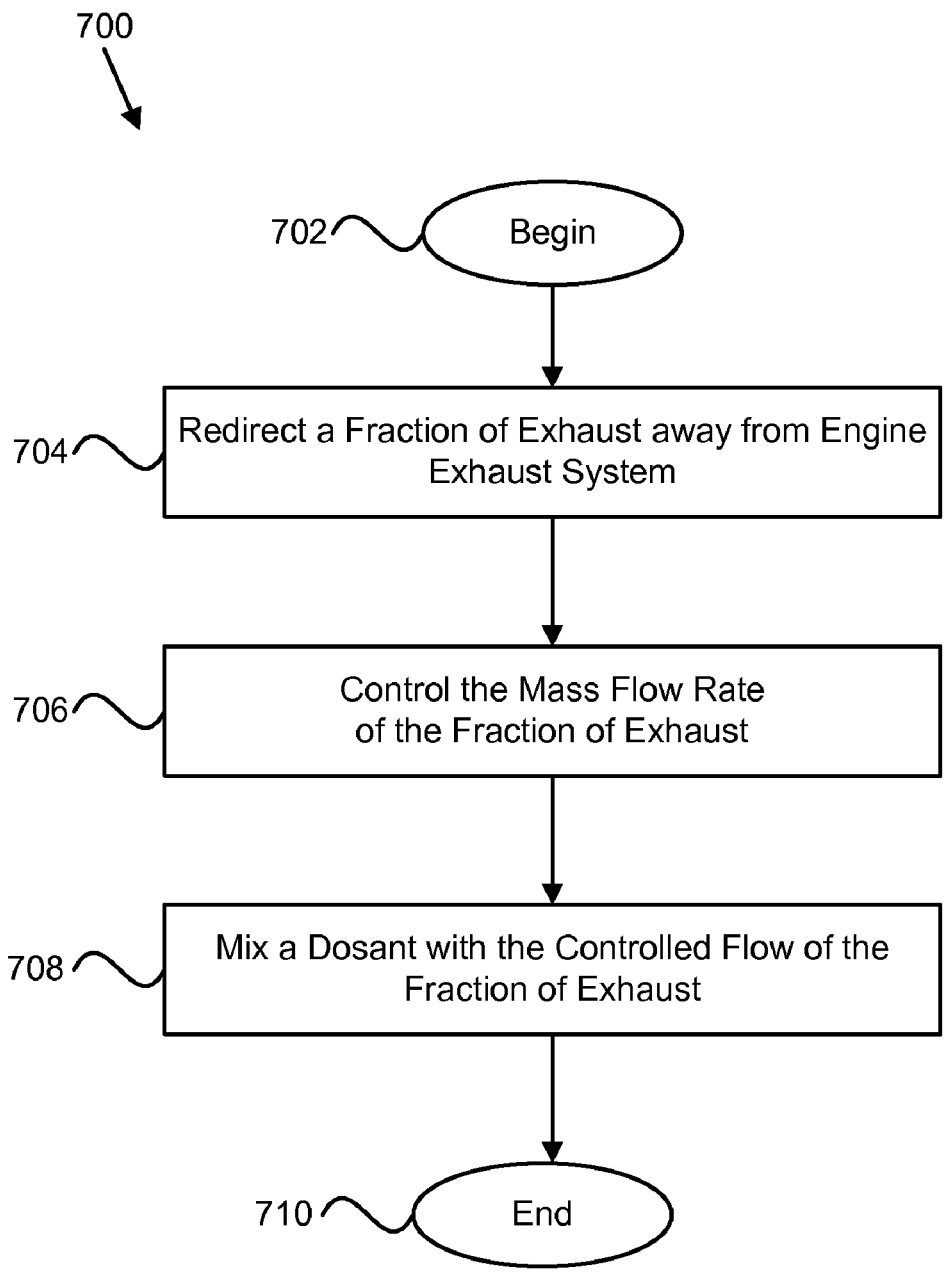
FIG. 7 is a schematic flow chart diagram illustrating one embodiment of a doser delivery method in accordance with the present invention.

FIG. 7 is a schematic flow chart diagram illustrating one embodiment of a doser delivery method 700 in accordance with the present invention. Although the method 700 is described below in terms of apparatus 100 and system 300, the method may be accomplished with other embodiments. The method 700 begins (702), and the exhaust redirection module 102 redirects 704 a fraction of exhaust away from the ordinary path of engine exhaust. The exhaust redirection module 102 then conveys the fraction of exhaust to the flow-rate module 104. In certain embodiments, the exhaust redirection channel intake 310 redirects 704 a fraction of exhaust 314 away from an engine exhaust system 312. The exhaust redirection channel 316 then conveys the fraction of exhaust 314 to a means for controlling the flow of the fraction of exhaust 314.

The flow-rate module 104 regulates and controls 706 the mass flow rate of the fraction of exhaust. The flow-rate module 104 then conveys the fraction of exhaust to the doser module 106. In one embodiment, one of ordinary skill in the art will use the narrowed region 324 of a choke 320 to take advantage of the phenomenon of choked flow and to keep the mass flow rate of the fraction of exhaust 314 in an acceptable range. In another embodiment, one skilled in the art will use a solenoid 402 with an exhaust redirection channel stop 404 to control the mass flow rate of the fraction of exhaust 314. In certain embodiments of the present invention, one of ordinary skill in the art uses neither a choke 320 nor a solenoid 402 and a stop 404 combination, but rather a commercially available flow regulator.

The doser module 106 mixes 708 the controlled fraction of exhaust with the dosant and the method 700 ends 710. In certain embodiments, the controlled fraction of exhaust 326 atomizes, disperses, vaporizes, mixes, and/or delivers a dosant 334 within a dosant delivery channel 328. The dosant delivery channel 328 then delivers the resultant mixture to the engine exhaust system 312, which conveys the resultant mixture 336 to the engine exhaust system 340.

Figure 8:
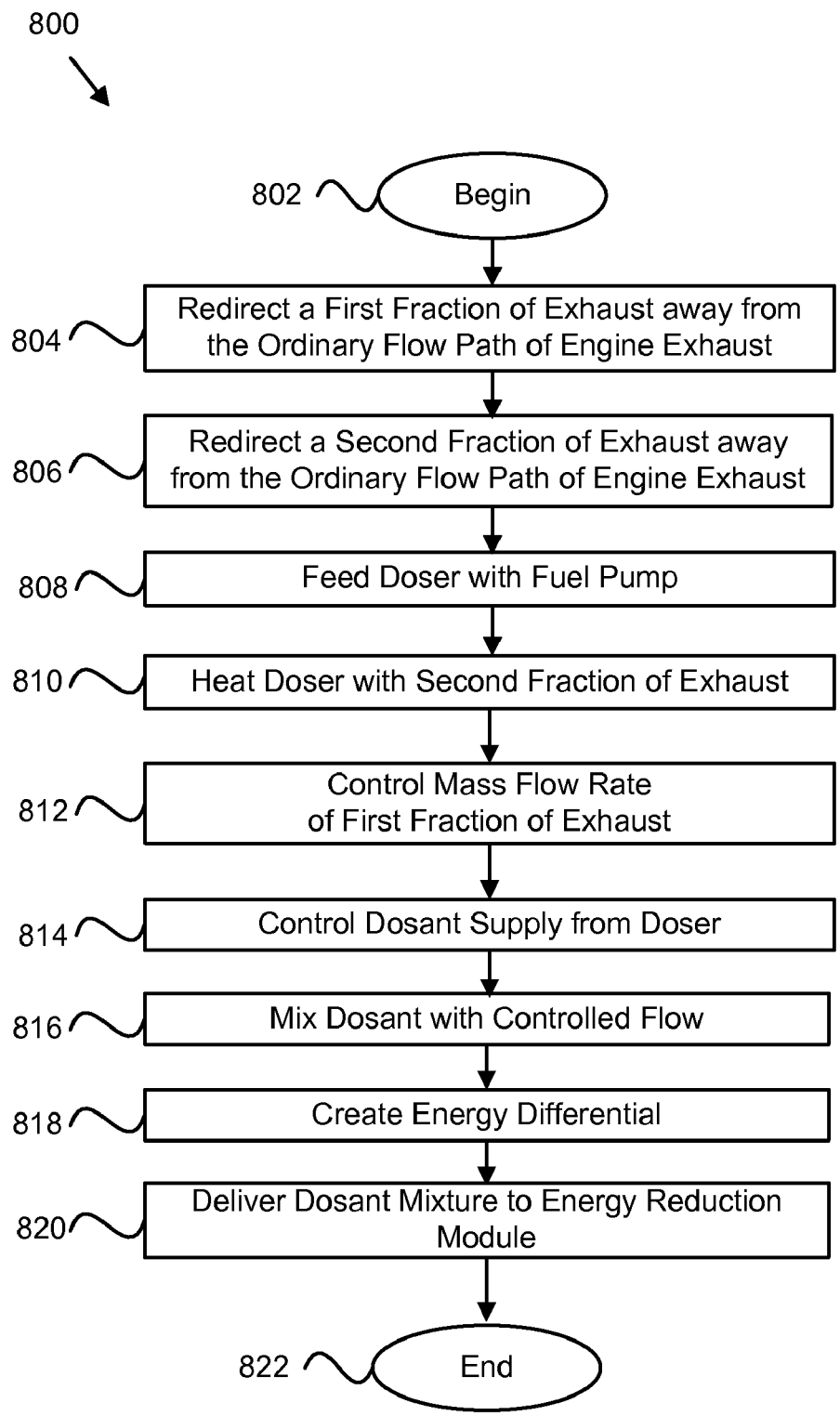
FIG. 8 is a schematic flow chart diagram illustrating another embodiment of a doser delivery method in accordance with the present invention.

FIG. 8 is a schematic flow chart diagram illustrating another embodiment of a doser delivery method 800 in accordance with the present invention. Although the method 800 is described below in terms of apparatus 200 and various systems 300, 400, 500, 600, the method may be accomplished with other embodiments. The method 800 begins (802), and the exhaust redirection module 102 redirects 804 a first fraction of exhaust away from the ordinary flow path of engine exhaust. In certain embodiments, the exhaust redirection channel intake 310 redirects 704 a fraction of exhaust 314 away from an engine exhaust system 312. The exhaust redirection channel 316 then conveys the fraction of exhaust 314 to a means for controlling the flow of the fraction of exhaust 314.

The dosant heater module 212 redirects 806 a second fraction of exhaust away from the ordinary flow path of engine exhaust. In one embodiment, an exhaust redirection channel stop 404, controlled by a solenoid 402, blocks the exhaust redirection channel 316 leaving only the second exhaust redirection channel 502 to collect a fraction of exhaust. When the exhaust redirection channel 316 is blocked, therefore, only a small, second fraction of exhaust 504 travels down the second exhaust redirection channel 502. In another embodiment, the heating redirection channel intake 604 of a heating redirection channel 602 receives a second fraction of exhaust 606 and conducts the second fraction of exhaust 606 to a series of heating pipes 608.

The dosant supply module 202 feeds 808 the doser with a fuel pump. In certain embodiments, the doser supply channel intake 612 of a doser supply channel 610 delivers a stream of fuel to the doser 332, to be used as a dosant 334. The doser supply channel 610 provides the stream of fuel 614 by redirecting it away from the fuel supply line 616 after a fuel pump 618. The fuel pump 618 pumps fuel from a fuel tank 620 that provides fuel to the engine 304. The dosant heater module 212 heats 810 a doser with the second fraction of exhaust. In certain embodiments, the heating redirection channel 602 is connected to heating pipes 608, used to warm the doser 332 and the dosant 343.

The flow-rate module 104 controls 812 the mass flow rate of the first fraction of exhaust. In one embodiment, one of ordinary skill in the art will use the narrowed region 324 of a choke 320 to takes advantage of the phenomenon of choked flow and to keep the mass flow rate of the fraction of exhaust 314 in an acceptable range. In another embodiment, one skilled in the art will use a solenoid 402 with an exhaust redirection channel stop 404 to control the mass flow rate of the fraction of exhaust 314. In certain embodiments of the present invention, one of ordinary skill in the art uses neither a choke 320 nor a solenoid 402 and a stop 404 combination, but rather a commercially available flow regulator.

The dosant supply module 202 controls 814 the dosant supply from the doser. In certain embodiments, one of ordinary skill in the art will use a dosant control valve 622, which may be programmable or attached to sensors in an engine 304, an exhaust system 312, and/or an exhaust treatment system 340. The dosant mixture module 204 mixes 816 the dosant with the controlled flow of the first fraction of exhaust. In one embodiment, the controlled fraction of exhaust 326 atomizes, vaporizes, disperses, and/or mixes with the dosant 334 in a dosant delivery channel 328. In another embodiment, the controlled fraction of exhaust 326 atomizes, vaporizes, disperses, and/or mixes with the dosant 324 in a mixing chamber 624.

The energy drop module 208 creates 818 an energy differential, whether a hydraulic differential, a thermal differential, or a combination of the two, in between the point where the exhaust redirection module 102 redirects a fraction of exhaust away from the ordinary flow path of the engine exhaust and the point where the mixture delivery module 206 returns the fraction of exhaust, admixed with the dosant, to the ordinary flow path. One of ordinary skill in the relevant art, in light of this disclosure, uses this energy differential to atomize, vaporize, disperse, and/or mix a dosant. In certain embodiments, the energy differential is created by the turbine 632 of a turbocharger 630, as energy rich exhaust 636 entering the turbine 632 becomes energy depleted exhaust 644 by using energy to turn the turbine 632.

The mixture delivery module 206 delivers 820 the dosant mixture to the energy reduction module 210, and the process ends 822. In certain embodiments, a dosant delivery channel 328 conducts the resultant mixture 336 of dosant 334 and the controlled fraction of exhaust 326 to the dosant delivery channel outtake 338 disposed in the engine exhaust system 312. The dosant delivery channel outtake 338 directs the resultant mixture 336 into the engine exhaust system 312 after the energy drop and on to the engine exhaust treatment system 340. The engine exhaust treatment system 340 may use the resultant mixture 336 for purposes of regeneration or to thermally and chemically condition the exhaust 306 and the resultant mixture 336 entering the engine exhaust treatment system 340. Treated exhaust 342 exits the exhaust treatment system 340.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dosant delivery apparatus comprising:
   a fractionator disposed downstream from an engine exhaust manifold and operating to redirect a fraction of exhaust from the engine manifold;
   a flow-rate regulator disposed downstream from the fractionator and operating to control the flow of the fraction of exhaust redirected by the fractionator;
   a doser disposed downstream of the flow-rate regulator and operating to provision a supply of dosant in the path of the controlled flow of the fraction of exhaust; and
   a first exhaust redirection channel, the channel comprising an inlet and an outlet, the inlet disposed to redirect a fraction of exhaust from the engine exhaust manifold;
   wherein the flow-rate regulator is a stop, controlled by a solenoid, that opens and closes the first exhaust redirection channel;
   wherein the solenoid controls the stop, which is disposed to extend across and to retract from the inlet of the first redirection channel, the apparatus further comprising a second redirection channel also having an inlet, the inlets of the first and second redirection channels disposed to redirect fractions of exhaust from the engine exhaust manifold, the first and second redirection channels also comprising an outlet; and
   wherein the solenoid controls the stop, which also is disposed to extend across and to retract from the inlet of the second redirection channel.

2. The apparatus of claim 1, wherein the inlets of the first and second exhaust redirection channels are operatively connected directly to the exhaust manifold.

3. The apparatus of claim 1, further comprising a control valve operatively connected to the doser to control the flow of dosant.

4. The apparatus of claim 3, wherein the stop the doser are combined in a single assembly.

5. The apparatus of claim 1, further comprising a mixing chamber disposed downstream of the stop and the doser.

6. The apparatus of claim 1, further comprising a dosant delivery channel, the channel comprising an inlet and an outlet, the inlet disposed downstream of the flow-rate regulator to receive a controlled fraction of exhaust and a dosant from the doser, and the outlet operatively connected to an engine exhaust system downstream of the engine exhaust manifold.

7. The apparatus of claim 6, further comprising a turbine disposed between the engine exhaust manifold and the outlet of the dosant delivery channel.

8. The apparatus of claim 1, wherein the stop and the doser are disposed in a location remote from the engine exhaust system.

9. The apparatus of claim 1, further comprising a doser heating channel, the channel comprising an inlet and an outlet, the inlet disposed to redirect the fraction of exhaust from the engine exhaust manifold redirected by the second redirection channel and the outlet configured to convey the fraction of the exhaust redirected by the inlet of the doser heating channel around the doser.

10. The apparatus of claim 1, wherein the stop opens and closes the exhaust first redirection channel by degrees.

11. The apparatus of claim 1, wherein the diameter of the first redirection channel is greater than the diameter of the second redirection channel.

12. An engine exhaust treatment system comprising:
a primary exhaust flow stream housing configured to house a primary exhaust flow stream;
a turbine of a turbocharger disposed in the primary exhaust flow stream, the turbine comprising an intake side and an outtake side;
a first elongate exhaust fraction channel, the channel comprising an inlet and an outlet, the inlet disposed upstream of the intake side of the turbine;
a flow-rate regulator disposed in the first elongate exhaust fraction channel, the flow-rate regulator being a stop;
a mixing chamber disposed downstream of the flow-rate regulator in the first elongate exhaust fraction channel;
a doser coupled to the mixing chamber;
a second elongate exhaust fraction channel, comprising an inlet and an outlet, the inlet coupled to the mixing chamber and the outlet disposed in the primary flow stream of the engine exhaust system downstream of the outtake side of the turbine;
an exhaust treatment system disposed in the primary exhaust flow stream downstream of the outlet of the second channel; and
a third elongate exhaust fraction channel, the third elongate exhaust channel comprising an inlet and an outlet, the inlet configured to redirect a fraction of exhaust from the primary exhaust flow stream and the outlet configured to deliver the fraction of exhaust to the doser;
wherein the stop is actuatable to extend across and retract from both the first and third elongate exhaust fraction channels.

13. The system of claim 12, wherein the stop, the doser, and the mixing chamber are combined in a single compact assembly.

14. A dosant delivery apparatus comprising:
means for redirecting a fraction of exhaust from the engine manifold, the means for redirecting comprising a first redirection channel that receives a first fraction of exhaust from the engine manifold and a second redirection channel that receives a second fraction of exhaust from the engine manifold;
means for controlling the flow of the redirected fraction of exhaust, the means for controlling comprising a stop that is actuatable to extend across and retract from both the first and second redirection channels; and
means for provisioning a dosant in the flow path of the redirected, controlled flow of the fraction of exhaust.

15. The apparatus of claim 14, further comprising means for mixing the dosant and the fraction of exhaust.

\* \* \* \* \*